US012697272B2

(12) United States Patent
Lunter et al.

(10) Patent No.: US 12,697,272 B2
(45) Date of Patent: Aug. 4, 2026

(54) RECOVERY AND WELLNESS POD APPARATUS

(71) Applicant: JTL Enterprises, Inc., Clearwater, FL (US)

(72) Inventors: Paul Lunter, Palm Harbor, FL (US); Timothy Elliot, Pinellas Park, FL (US); Mario Simoes, Pinellas Park, FL (US)

(73) Assignee: JTL Enterprises, Inc., Clearwater, FL (US)

( * ) Notice: Subject to any disclaimer, the term of this patent is extended or adjusted under 35 U.S.C. 154(b) by 0 days.

(21) Appl. No.: 17/511,914

(22) Filed: Oct. 27, 2021

(65) Prior Publication Data

US 2022/0125674 A1 Apr. 28, 2022

Related U.S. Application Data

(60) Provisional application No. 63/106,697, filed on Oct. 28, 2020.

(51) Int. Cl.
*A61H 23/04* (2006.01)

(52) U.S. Cl.
CPC ....... *A61H 23/04* (2013.01); *A61H 2023/045* (2013.01); *A61H 2201/01* (2013.01); (Continued)

(58) Field of Classification Search
CPC ...... A61H 9/0021; A61H 23/02; A61H 23/04; A61H 2009/0035; A61H 2201/01; (Continued)

(56) References Cited

U.S. PATENT DOCUMENTS

| | | | | |
|---|---|---|---|---|
| 1,364,365 A * | 1/1921 | Golden | .................. | A61H 33/06 454/197 |
| 1,790,364 A * | 1/1931 | Bender | .................. | A61H 33/06 607/83 |

(Continued)

FOREIGN PATENT DOCUMENTS

| | | |
|---|---|---|
| CN | 304106145 | 4/2017 |
| CN | 110604418 A | 12/2019 |

(Continued)

OTHER PUBLICATIONS

English translation of Lee (KR 101393283 B1) (Year: 2014).*

(Continued)

*Primary Examiner* — Timothy A Stanis
*Assistant Examiner* — Christopher E Miller
(74) *Attorney, Agent, or Firm* — Nelson Mullins Riley & Scarborough LLP

(57) ABSTRACT

An apparatus for massage of a user in a reclined position, including a housing structure having a base portion with a user support surface for supporting the user in a reclined position, and a top cover portion that extends the full length of the base portion so that the user being disposed or the user support surface is disposed between the base portion and the top cover portion, a massage assembly disposed adjacent the user support surface, and a video display disposed on an inner surface of the top cover portion so that the video display is visible to the user disposed on the user support surface.

10 Claims, 10 Drawing Sheets

(52) U.S. Cl.
CPC ................ *A61H 2201/0207* (2013.01); *A61H 2201/102* (2013.01); *A61H 2201/1645* (2013.01); *A61H 2201/5043* (2013.01); *A61H 2203/0437* (2013.01)

(58) Field of Classification Search
CPC ...... A61H 2201/0207; A61H 2201/025; A61H 2201/102; A61H 2201/1633; A61H 2201/164; A61H 2201/1645; A61H 2201/5043; A61H 2201/5048; A61H 2203/0437; A61H 2035/004; A61H 33/06; A61H 2201/0142; A61H 2033/061; A61H 33/066; A47C 29/003; A47C 19/20; A47C 17/00; A47C 17/52
See application file for complete search history.

(56) References Cited

U.S. PATENT DOCUMENTS

D209,643 S 12/1967 Mozneck
D217,449 S 5/1970 Meyer
3,826,250 A * 7/1974 Adams .............. A61M 21/0094 601/16
4,258,706 A 3/1981 Shank
4,281,224 A * 7/1981 Castagna ............ B60R 11/0223 381/86
4,565,188 A * 1/1986 Hardie ................... A61H 33/06 601/16
4,635,620 A 1/1987 Ricchio
4,712,538 A * 12/1987 Hardie ................... A61H 33/06 601/16
4,976,256 A 12/1990 Marlin et al.
5,016,395 A * 5/1991 Walker ................. B61D 17/005 52/630
5,101,809 A * 4/1992 Daffer ................... A61M 35/00 601/16
5,258,706 A 11/1993 Brunner et al.
5,380,269 A 1/1995 Urso
5,503,618 A 4/1996 Rey
5,645,578 A 7/1997 Daffer et al.
5,725,472 A * 3/1998 Weathers .......... A61M 21/0094 600/545
6,036,663 A 3/2000 Arzt
6,272,697 B1 * 8/2001 Park ....................... A61H 33/06 607/83
6,428,466 B1 * 8/2002 Licht ........................ A61H 9/00 600/27
6,497,717 B1 * 12/2002 Daffer .................... A61H 33/06 607/81
6,572,570 B1 6/2003 Burns et al.
6,682,494 B1 * 1/2004 Sleichter, III .......... B60N 2/976 297/217.3
D509,371 S 9/2005 Natuzzi
D530,933 S 10/2006 Vitaro
7,556,040 B2 * 7/2009 Meyer .................. A61G 10/026 128/202.16
D602,269 S 10/2009 Jamison et al.
D608,555 S 1/2010 Aoki
8,348,871 B2 1/2013 Elliott et al.
D744,256 S 12/2015 Schoors et al.
D824,185 S 7/2018 Wang et al.
D840,183 S 2/2019 Rideau
D845,015 S 4/2019 Milne
D869,182 S 12/2019 Lin et al.
10,548,764 B2 * 2/2020 Alzeer .................. A61F 7/0085
10,561,250 B2 * 2/2020 Schwab ................. A47C 7/725
D889,864 S 7/2020 Bang et al.
D899,131 S 10/2020 Gray
D907,386 S 1/2021 Zheng et al.
D911,536 S 2/2021 Lunter et al.
D919,315 S 5/2021 Svendsen
D921,388 S 6/2021 Wang
D946,916 S 3/2022 Shin et al.
D951,668 S 5/2022 Li
D960,385 S 8/2022 Schubert et al.
D981,125 S 3/2023 Zhao
D992,293 S 7/2023 Seo
D1,035,895 S 7/2024 Lunter et al.
2001/0051565 A1 12/2001 Alessandri
2002/0151830 A1 10/2002 Kahn
2003/0013969 A1 1/2003 Erikson et al.
2003/0089370 A1 * 5/2003 Daffer .................... A61H 35/00 128/201.24
2003/0139693 A1 7/2003 Swift
2004/0260364 A1 12/2004 Daffer et al.
2005/0059910 A1 * 3/2005 Licht ................. A61M 21/0094 601/55
2005/0203447 A1 9/2005 Pisani et al.
2006/0129074 A1 6/2006 Wang
2007/0100261 A1 5/2007 Turell et al.
2007/0256607 A1 * 11/2007 Friedman ................. A45C 5/06 108/36
2008/0097259 A1 4/2008 Flick et al.
2008/0235872 A1 * 10/2008 Newkirk .............. A61G 7/0524 5/658
2009/0019634 A1 * 1/2009 Lipponen ............. A61H 9/0071 4/524
2009/0031267 A1 1/2009 Ueki
2009/0222070 A1 9/2009 Daffer
2009/0312679 A1 * 12/2009 Elliott .................. A61H 9/0021 601/158
2009/0312680 A1 12/2009 Lunter et al.
2010/0191158 A1 * 7/2010 Leventhal .......... A61H 23/0254 601/131
2010/0204760 A1 * 8/2010 Lawliss ................ A61H 33/066 607/81
2010/0286752 A1 * 11/2010 Hirata .................. A61N 5/0613 607/100
2011/0030141 A1 * 2/2011 Soderberg ............. A61M 5/172 5/600
2011/0251535 A1 * 10/2011 Bender ................. A61M 21/02 601/49
2012/0016274 A1 1/2012 Howe
2013/0096473 A1 * 4/2013 Berezhov ............. A47C 21/003 601/148
2014/0222121 A1 8/2014 Spence et al.
2016/0008568 A1 * 1/2016 Attia ...................... A61B 5/486 600/28
2016/0029808 A1 2/2016 Youngblood et al.
2016/0081877 A1 * 3/2016 Marconi ................ A47K 3/024 4/496
2016/0127129 A1 * 5/2016 Chee ..................... H04L 9/0866 713/189
2016/0140307 A1 * 5/2016 Brosnan ................. G06Q 10/10 600/509
2016/0206506 A1 * 7/2016 Henkemans ....... A61H 33/0087
2017/0143565 A1 5/2017 Childs et al.
2018/0160819 A1 * 6/2018 Rutledge .............. A47C 21/003
2018/0360649 A1 12/2018 Daffer
2019/0262169 A1 8/2019 Vergara et al.
2020/0027607 A1 1/2020 Muller
2020/0115200 A1 * 4/2020 Sellman ................ E21B 19/008
2020/0139870 A1 5/2020 Mergl et al.
2020/0170882 A1 6/2020 Park et al.
2020/0276076 A1 9/2020 Lunter et al.
2021/0007928 A1 * 1/2021 Howe .................. A61H 23/006
2021/0022564 A1 * 1/2021 Yoo ........................... A61L 9/14
2022/0071402 A1 * 3/2022 Pallett .................. A47C 21/044
2022/0125674 A1 4/2022 Lunter et al.
2023/0144593 A1 5/2023 Howe
2023/0218429 A1 7/2023 Lunter et al.
2024/0252385 A1 8/2024 Lunter et al.

FOREIGN PATENT DOCUMENTS

CN 110624180 A 12/2019
CN 110680729 A 1/2020
CN 110881880 A 3/2020
DE 19716808 A1 10/1998
TW 201028139 A 8/2010

(56) References Cited

FOREIGN PATENT DOCUMENTS

| | | | |
|---|---|---|---|
| TW | M469905 | U | 1/2014 |
| WO | 2022/094006 | A1 | 5/2022 |
| WO | 2023/137092 | A2 | 7/2023 |

OTHER PUBLICATIONS

International Search Report and Written Opinion, PCT/US 21/56930, dated Febuary 25, 2022, 11 pages.

Dry Heat Pods, Wellness USA, [Post date Jan. 24, 2022], [Site seen Jul. 12, 2023], Seen at URL: <https://wellness-usa.com/copy-3/> (Year: 2022).

RelaxSpace Wellness pod, Relax, [Post date: Jun. 25, 2022], [Site seen Jul. 12, 2023], seen at URL: https://wellnessspace.com/ relaxspace-wellness-pods/ (Year: 2022).

CryoLounge Logo, wellnessspace.com <http://wellnessspace.com>, [online], [site visited Aug. 25, 2023], Available from internet URL: https://wellnessspace.com/ cryolounge-plus/ (Year: 2023).

Cryo Lounge AR, first available Aug. 17, 2023, facebook.com, [online], [site visited Aug. 25, 2023], Available from internet URL: https://business.facebook.com/permalink.php?story_fbid=pfbid031UQBGJACDhmBb1JZQyTtoBGNk2LsFXreNy7w8HF6ejcjDXoLPSkyT8KAXBg5xP6MI&id=100094 028918929> (Year: 2023).

International Search Report and Written Opinion, PCT/US23/10659, dated Aug. 10, 2023, 16 pages.

Extended European Search Report in European National Phase Patent Application No. 21887476.6, issued Aug. 9, 2024, all enclosed pages cited.

International Preliminary Report on Patentability issued in PCT/US2023/010659, mailed Jul. 25, 2024, all enclosed pages cited.

Taiwanese Office Action in Taiwanese Patent Application No. 110140164, issued Dec. 23, 2024, all enclosed pages cited.

Partial European Search Report in European National Phase Patent Application No. 23740646.7, issued Dec. 11, 2025, all enclosed pages cited.

* cited by examiner

RECOVERY AND WELLNESS POD APPARATUS

CLAIM OF PRIORITY

This application claims priority to U.S. Provisional Application No. 63/106,697, filed Oct. 28, 2020, the entire disclosure of which is incorporated by reference herein.

FIELD OF INVENTION

The present disclosure relates generally to apparatus for applying a relaxing effect to the body of a user and, more particularly, to an apparatus utilizing multiple effects on the senses of a user to obtain a relaxing effect.

BACKGROUND

Massage is a time-honored and effective therapy for achieving relaxation, as well as treating muscular injuries, strains and general soreness. However, although massage is recommended by many physicians for such purposes, this therapy has limited availability due to a scarcity of trained, qualified masseurs. As a result, many devices and apparatus have been proposed in the past for producing a massage-like manipulation of a user's body by various means, ranging from mechanically or electrically generated vibrations or pulsations, often accompanied by heating.

The majority of such known massage apparatus are in the form of a bed-type structure having an essentially horizontal user support surface on which the user may lay in a recumbent position. Advantageously, the horizontally recumbent position of the user's body in such bed-type structures enables either a portion or the entire length of the user's body to be treated by the massage apparatus. On the other hand, one of the disadvantages of a bed-type massage apparatus is that the supine disposition of the user is not conducive to enabling the user to engage in other activities during the operation of the apparatus, e.g., reading, watching television, operation of a laptop computer or other personal electronic device, etc. Additionally, experience has shown that many individuals feel uncomfortable using an open bed-type massage apparatus in public in which they are required to lie down on the machine and visible to all other occupants of the room in which the massage apparatus is disposed. Many users suggest that a reclined or seated disposition would lead them to feel less vulnerable, as well as an apparatus that offered more privacy than a standard bed-type apparatus. As well, because the known bed-type massage apparatus have no structure above the flat bed-type structure, the user is subjected to the environment (gym, care facility, etc.) surrounding the massage apparatus, which may lack the proper ambiance to achieve the desired level of relaxation. For such reasons, a desire has been expressed in the industry for a dry hydro-therapy massage apparatus wherein the user rests in a generally seated disposition during operation of the apparatus, allowing the user to read a book or magazine, watch television, or remain otherwise occupied with other activities.

SUMMARY

One embodiment in accordance with the present disclosure is an apparatus for massage of a user in a reclined position, including a housing structure having a base portion with a user support surface for supporting the user in a reclined position, and a top cover portion that extends the full length of the base portion so that the user being disposed or the user support surface is disposed between the base portion and the top cover portion, a massage assembly disposed adjacent the user support surface, and a video display disposed on an inner surface of the top cover portion so that the video display is visible to the user disposed on the user support surface.

Another embodiment in accordance with the present disclosure is an apparatus for relaxation of a user in a reclined position, including a housing structure having a base portion with a user support surface for supporting the user in a reclined position, the user support surface further includes a substantially planar seat back portion, a substantially planar leg portion, and a seat portion disposed therebetween, wherein the seat back portion and the leg portion form an angle therebetween, a top cover portion that extends the full length of the base portion so that the user being disposed or the user support surface is disposed between the base portion and the top cover portion, and a video display disposed on an inner surface of the top cover portion so that the video display is visible to the user disposed on the user support surface.

The accompanying drawings, which are incorporated in and constitute a part of this specification, illustrate one or more embodiments of the disclosure and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended drawings, in which.

Figure 1A:
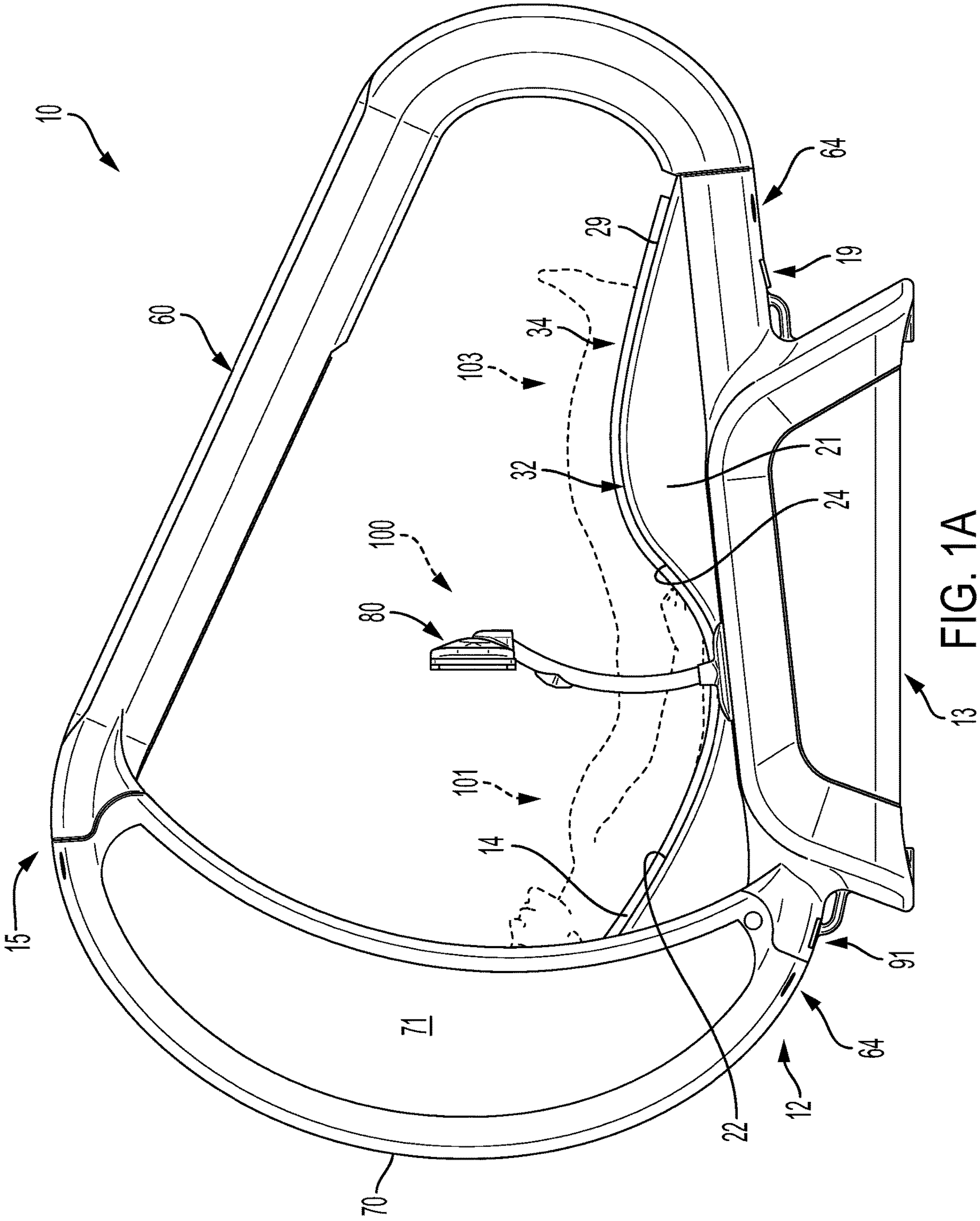
FIGS. 1A, 1B, and 1C are a right side plan view, a front perspective view, and a rear perspective view of a recovery and wellness pod apparatus in accordance with an embodiment of the present disclosure.

Repeat use of reference characters in the present specification and drawings is intended to represent same or analogous features or elements of the invention according to the disclosure.

DETAILED DESCRIPTION

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1B:
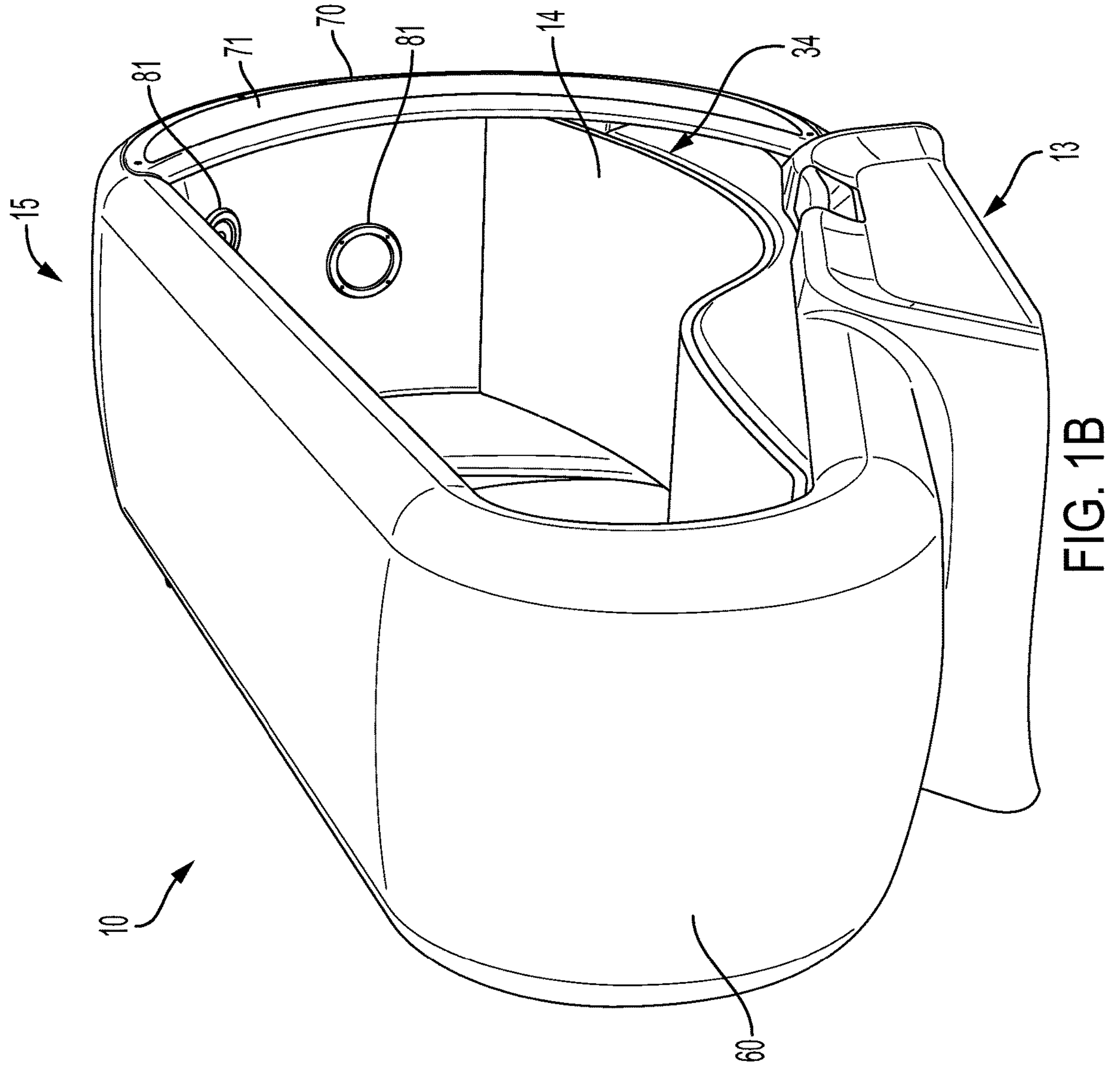
Figure 1C:
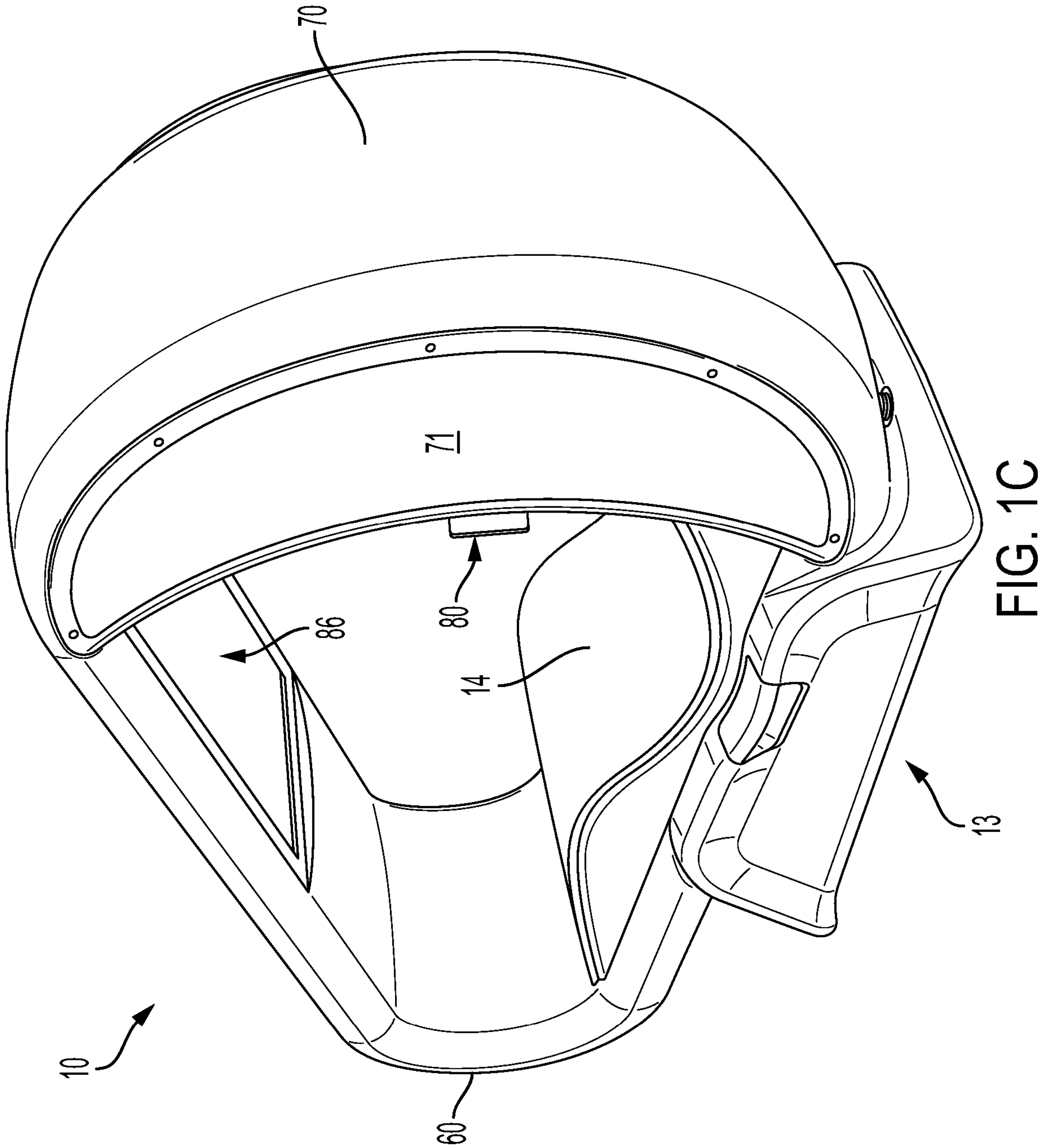

As used herein, terms referring to a direction or a position relative to the orientation of the recovery and wellness pod assembly, such as but not limited to "vertical," "horizontal," "top," "bottom," "above," or "below," refer to directions and relative positions with respect to the recovery and wellness pod assembly's orientation in its normal intended operation, as indicated in FIGS. 1A, 1B, and 1C. Thus, for instance, the terms "vertical" and "top" refer to the vertical orientation and relative upper position in the perspective of FIGS. 1A, 1B, and 1C and should be understood in that context, even with respect to a recovery and wellness pod assembly that may be disposed in a different orientation.

Further, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "and" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "and," and "the" may include plural references, and the meaning of "in" may include "in" and "on." The phrase "in one embodiment," as used herein, does not necessarily refer to the same embodiment, although it may.

As will be readily understood by persons skilled in the relevant art, the recovery and wellness pod apparatus of the present disclosure is readily adapted to be embodied in many and various forms to accommodate relaxation of a user in differing reclined positions. The present disclosure is described herein in one contemplated embodiment of such apparatus, but only for purposes of providing an exemplary enabling disclosure of the invention and, in particular, the invention is not intended to be limited, and should not be construed as limited, to application or embodiment in such apparatus nor any other particular structure except as defined in the claims appended hereto.

Referring now to the accompanying drawings and initially to FIGS. 1A through 1C, a recovery and wellness pod apparatus according to one embodiment of the present disclosure is generally indicated at 10. The pod apparatus 10 includes a housing structure, generally indicated at 12, generally in the form of a hollow lounge chair-style base housing shell 13, including a top cover structure 15 extending the length thereof. The base housing shell 13 presents an upwardly facing top side configured to receive a user support surface 34 thereon that is designed for a user 100 to rest thereon for treatment. These treatments may include, but not limited to, massage, aromatherapy, auditory sessions, etc., in a seated reclining position, as more fully explained hereinafter. A fluid spray assembly, generally indicated at 16 (FIG. 2), is disposed within the base housing shell 13 in association with a pressurized fluid supply arrangement 18, which is disposed within the hollow base housing shell as well and includes a pump 28, preferably a liquid pump, for directing a pressurized fluid emission from a liquid storage reservoir 29 at the underside of the user support surface 34 to transmit a massaging effect therethrough to the body of the user 100 seated thereon. The top cover structure is immovably mounted with respect to the base housing shell, meaning that it is fixed without any hinge, pivot, or otherwise movable connection, once assembled. The top cover portion in this embodiment has convexly shaped front and rear end walls with a convex outer surface and a convex inner surface (i.e., the inner surface follows the convex shape of the outer surface).

Figure 4:
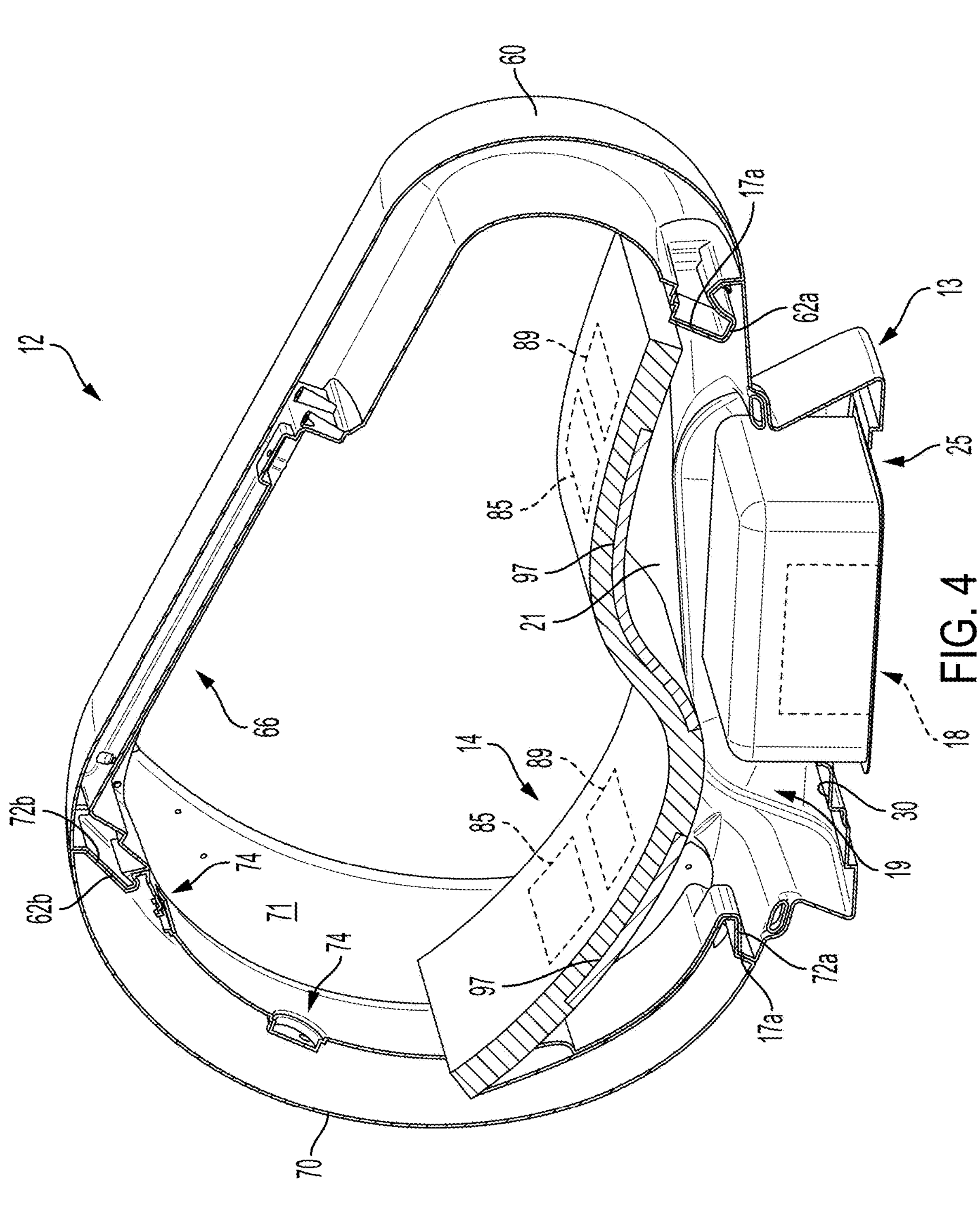
FIG. 4 is a cross-sectional view of the recovery and wellness pod apparatus shown in FIG. 2, taken along line 4-4.

Referring additionally to FIG. 4, the base housing shell 13 is preferably generally in the form of a tank or tub of an elongated configuration having a bottom wall 30 and side walls 21, and substantially open at its top to define an upwardly-facing elongated opening. Preferably, the bottom wall 30 may also define an aperture therein that is configured to receive an enclosure 25 therein for containing various components of the fluid supply arrangement 18, such as the pump 28, fluid reservoir 29, etc. As shown in FIG. 4, the perimeter of the aperture defined in the bottom wall 30 of the base housing shell 13 forms a leak-proof seal with the outer surface of the enclosure 25. As such, water utilized by the fluid spray assembly 16 during massage treatment of the user 100 is retained within the base housing shell 13 until returned to the water storage reservoir 29 within the enclosure 25 via associated piping. The base housing shell 13 may be fabricated of any suitable watertight, rigid material of appropriate strength which may be formed to the desired configuration herein described, e.g., fiberglass, plastic, or a like material. The base housing shell 13 provides an open volume 19 (FIG. 4) beneath the user support surface 34 for enclosure of various operating components of the pod apparatus 10.

As best seen in FIGS. 1A and 1B, the lateral side walls 21 of the base housing shell 13 are contoured to form a substantially-planar seat back portion 22 and a seat portion 24 having a substantially-planar leg portion 29, supporting the user support surface 34. Preferably, the seat back portion 22 and the leg portion 29 are angularly oriented with respect to each other, with the seat portion 24 being disposed therebetween. The user support surface 34 is configured so that the upper and lower body portions 101 and 103, respectively, of the user 100 are supported in a generally reclining seated disposition comparable to that of a lounge-style chair wherein the user's body rests bent at the waist and knees with the upper body portion 101 partially reclined on the seat back portion 22, the upper leg extent of the lower body portion 103 slightly inclined on the seat portion 24, and the lower leg extent of the lower body portion 103 slightly declined on the leg portion. The slight bend of the knees of the user's legs help to maintain the user 100 in the proper position on the user support surface 34. As such, the pressurized water jets will impact the user 100 in the proper areas of the user's body to achieve the desired massaging effect.

A liquid medium is preferred as the fluid medium utilized by the pod apparatus 10 for supply to and emission from the fluid spray assembly 16 to produce a massage effect as hereinafter described, water being an optimal liquid in view of its ready availability and generally non-corrosive and non-caustic character. As noted, a suitable supply of water is stored in the water storage reservoir 29 for continuous circulation through the fluid supply arrangement 18 to the fluid spray assembly 16. The bottom drainage wall 30 (FIG. 4), as well as the other interior surfaces of the base housing shell 13 are configured to drain the liquid emitted from the fluid spray assembly 16 into the water storage reservoir 29. Of course, as those persons skilled in the art will readily recognize, pressurized air, other gases, and other fluidic materials could also be utilized as the fluid massaging medium without departing from the scope and substance of the present disclosure and, accordingly, the present disclosure is not intended to be and should not be construed as limited to the use of water or another liquid massage medium.

It is also preferred that the water or other massage liquid be heated to enhance the massaging effect produced by the liquid, e.g., to a temperature approximating normal body temperature, preferably in the range of 95 to 100 degrees Fahrenheit, although the apparatus has the capability of a broad range of liquid temperatures. For this purpose, a heater element (not shown) may be provided, e.g., mounted within the storage reservoir 29 below the normal level of massage liquid therein to be substantially continuously submerged in the stored massage liquid. A thermostat (not shown) is preferably provided in the electrical circuit to the heating element to provide selective control of the temperature of the massage liquid by the user.

In the preferred embodiment of the pod apparatus 10, in which the fluid spray assembly 16 is utilized for fluid massage, the user support surface 34 may be formed of a relatively thin sheet of a waterproof material affixed in watertight relationship with a flange 32 bordering the upwardly facing opening, as shown in FIG. 1A. Preferably, the sheet is sufficiently thin that the impact of fluid emitted from the fluid spray assembly 16 against the underside of the sheet transmits a massaging effect through the sheet to the body of the user 100. Further, the sheet is preferably of a sufficient flexibility and resiliency to substantially conform to the body of the user 100 for maximum transmission of the massage effect through the sheet to the user 100. In this manner, the sheet functions in the nature of a waterproof membrane to keep the user 100 dry during body massage operations of the pod apparatus 10 without noticeably dampening the massaging impact of fluid emitted from the fluid spray assembly 16. For example, a latex rubber in sheet form, in the range of 15 to 55 mil. thickness, is a suitable material to provide these characteristics for the sheet, although various other commercially available rubber and plastic sheeting materials should also provide suitable results.

As a primary means of weight bearing support of the user 100, an open-mesh netting (not shown) may be affixed in tensioned condition to the flange 32 of the base housing shell 13 horizontally across its opening immediately beneath the sheet. The netting should be of sufficient strength to independently support the weight of a user 100 to provide a safety barrier in the event of a rupture or other failure of the sheet. At the same time, the open-mesh construction of the netting permits essentially unrestricted transmission of fluid from the fluid spray assembly 16 through the netting and against the underside of the sheet.

Figure 2:
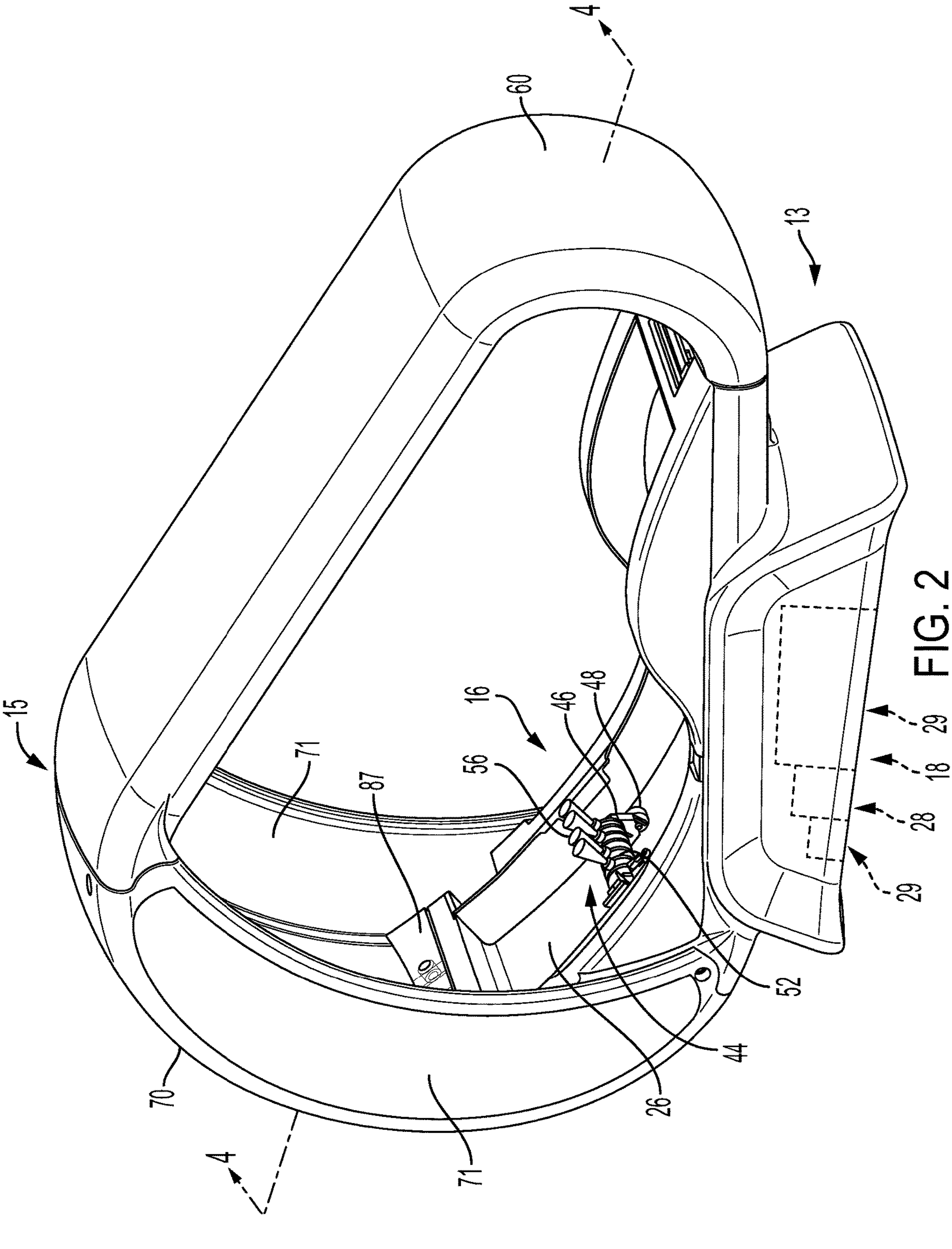
FIG. 2 is a right side perspective view of the recovery and wellness pod apparatus shown in FIGS. 1A, 1B, and 1C, with the user support surface removed to show interior details.

Referring now to FIG. 2, the fluid spray assembly 16 includes an elongate massage spray head, generally indicated at 44, oriented transversely across substantially the widthwise extent of the user's body. The massage head 44 may be of any of various possible configurations and componentry adapted to emit the massage fluid under pressure against the underside of the sheet. For example, in one possible configuration, the massage head 44 may have a substantially hollow outer body 52 with a plurality of emission openings 56, each in the form of a nozzle, over substantially the full extent of the upward surface of the body 52 which faces the sheet. The emission openings 56 deliver pressurized fluid from the body 52 in a jet-like spray upwardly therefrom against the underside of the sheet.

The hollow outer body 52 of the massage spray head 44 is preferably formed of injection-molded upper and lower body portions. Preferably, a radiused inlet (not shown) is configured to provide a smooth inlet flow of water into the interior of the outer body 52 so that the flow within the outer body 52 is less turbulent. As well, the emission openings 56 are preferably disposed along a line that is offset from the longitudinal center axis of the hollow outer body 52. The combination of the radiused inlet 84, subsequent laminar flow within outer body 52, and the offset emission openings 56 allow the massage spray head 44 of the present pod apparatus 10 to attain an optimal massage spray that includes both laminar and turbulent flows, resulting in the desired massaging effect.

Still referring to FIG. 2, the elongated massage head 44 is supported at each opposite end by brackets 46 with rollers or wheels 48 for rolling travel along a track 26 traversingly back-and-forth through substantially the full lengthwise extent of the base housing shell 13 along angularly changing paths of travel following the angular configuration of the track 26. The angular track 26 is affixed interiorly to the bottom wall 30 of the base housing shell 13, preferably through substantially the full lengthwise extent of the base housing shell 13. The rollers 48 travel along the track 26 during lengthwise traversing travel along the track. Preferably, the track 26 is of one-piece construction. The traversing travel of the massage head 44 is driven reciprocally back-and-forth through the lengthwise extent of the base housing shell 13 via any suitable drive mechanism. For example, a toothed timing belt (not shown) may be attached at opposite belt ends to each respective bracket 46 at the ends of the massage head 44, forming two endless drive belt loops which are trained about a series of toothed guide pulleys (not shown) rotatably mounted to the interior surfaces of the side walls 21 adjacent the track 26 at each opposite end of the base housing shell 13 and also at the location of each change of angular direction in the track 26. The pulleys at one end of the base housing shell 13 would then be secured to a common drive shaft journaled through one side wall 21 and connected exteriorly thereof to a reversible drive motor (not shown) for imparting synchronous drive motion to the belts and, in turn, to the massage head 44 to travel along the track 26.

The pressurized fluid is delivered from the fluid supply arrangement 18 to the massage head 44 in any suitable way. For example, the pressurized fluid supply arrangement 18 may have an electric motor 90 driving the liquid pump 28 to draw fluid from the liquid storage reservoir 29, both the liquid pump 28 and the water storage reservoir 29 being stored within the enclosure 25 of the base housing shell 13. The outlet side of the pump 28 delivers the fluid under pressure to the massage head 44 through a suitable conduit (not shown) that is in fluid communication with the outer body 52 of the massage head 44.

Figure 3A:
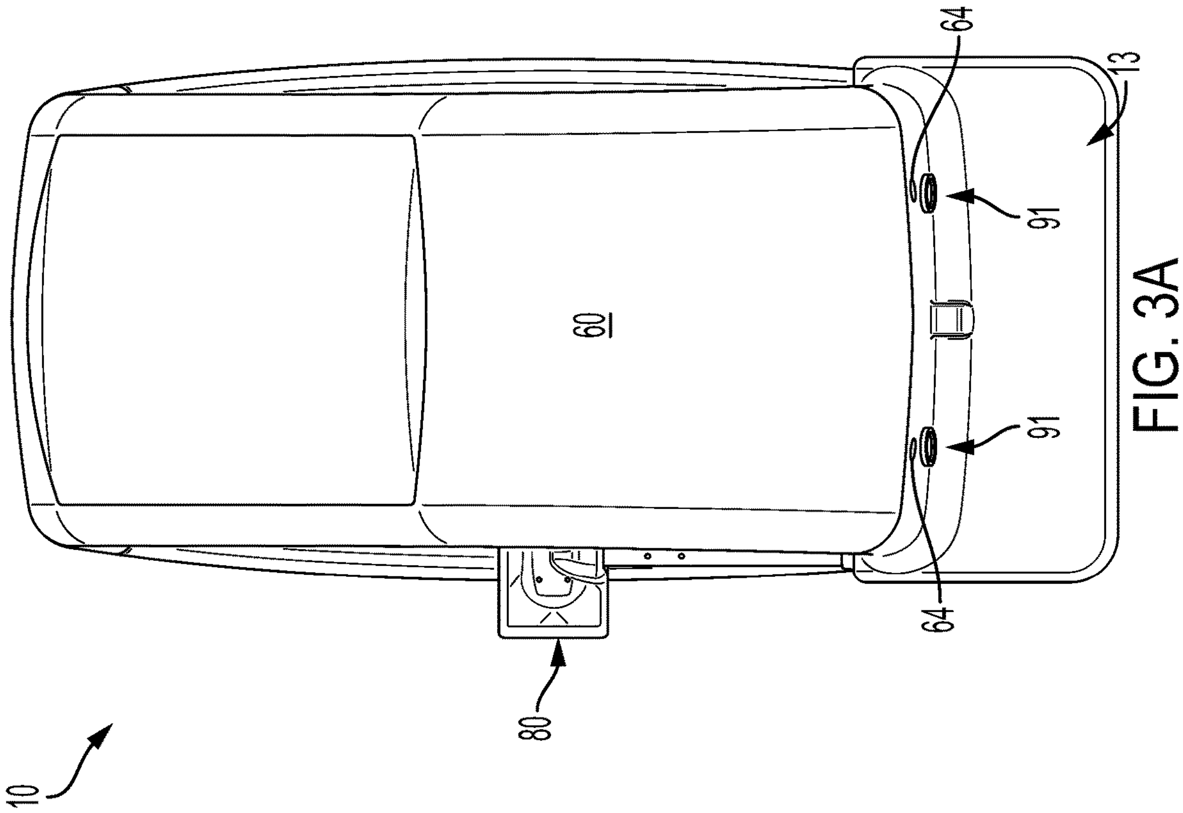
FIGS. 3A, 3B, 3C, and 3D are front, rear, top, and bottom plan views of the recovery and wellness pod apparatus shown in FIGS. 1A, 1B, and 1C.
Figure 3B:
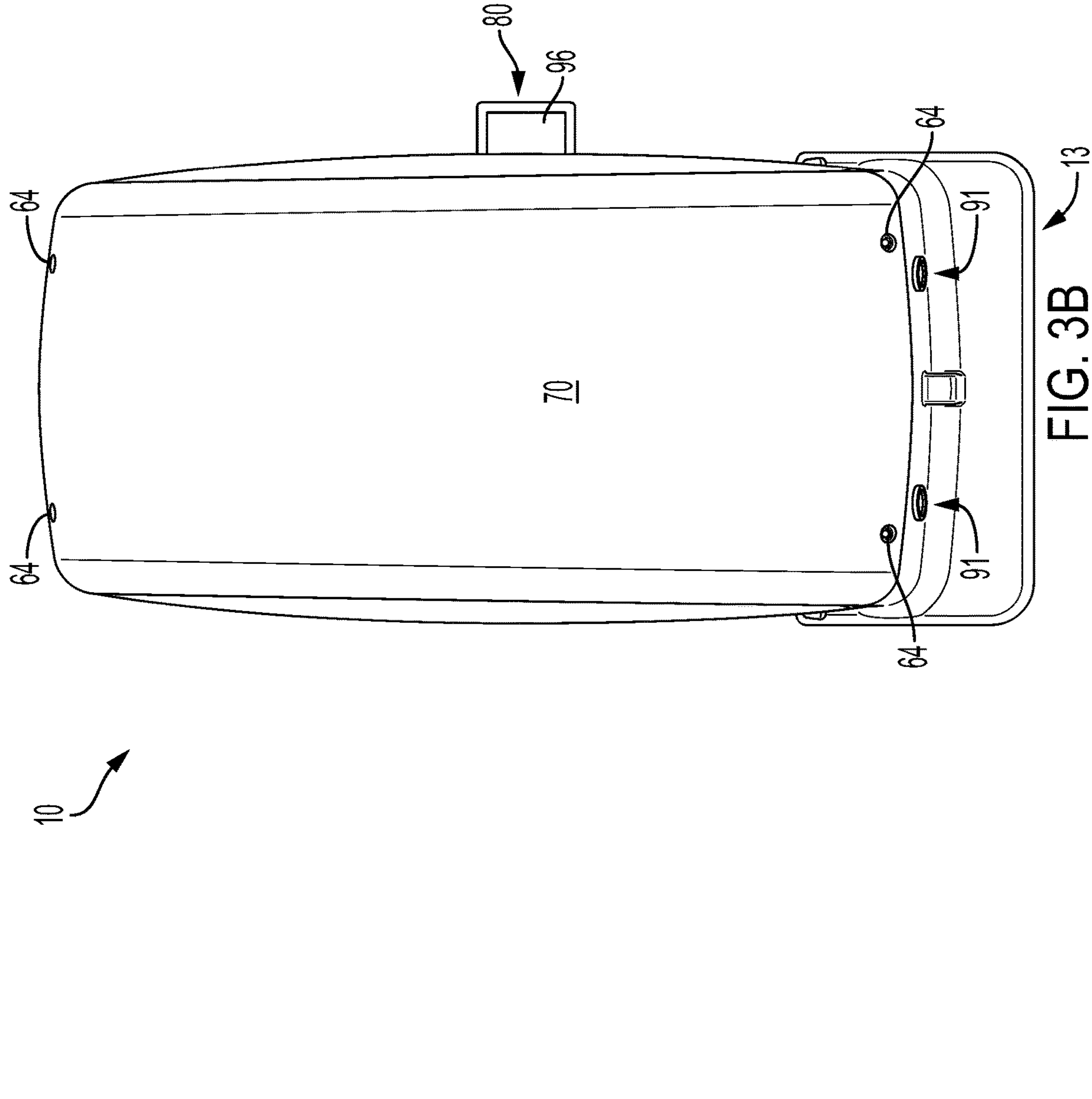
Figure 3C:
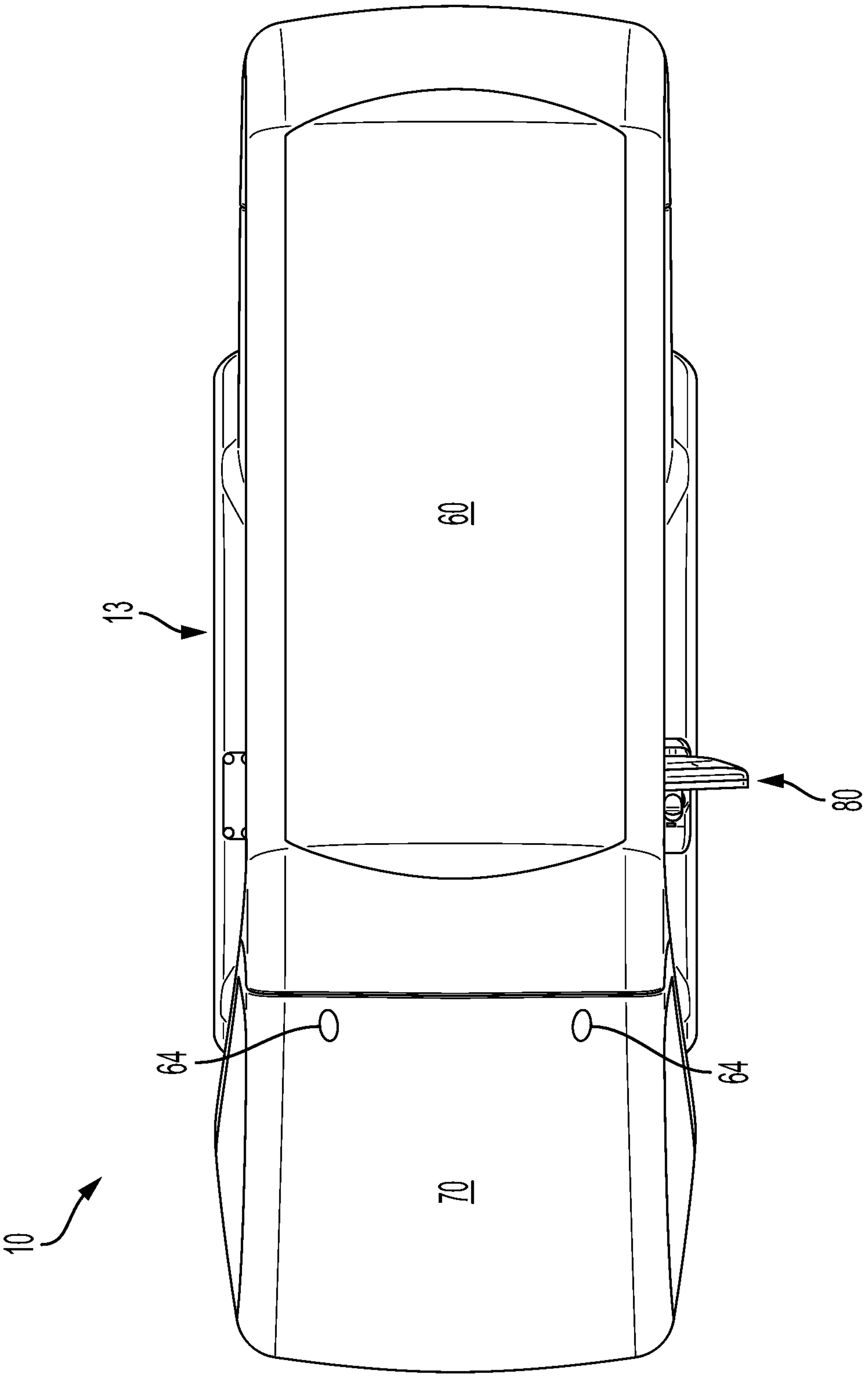
Figure 3D:
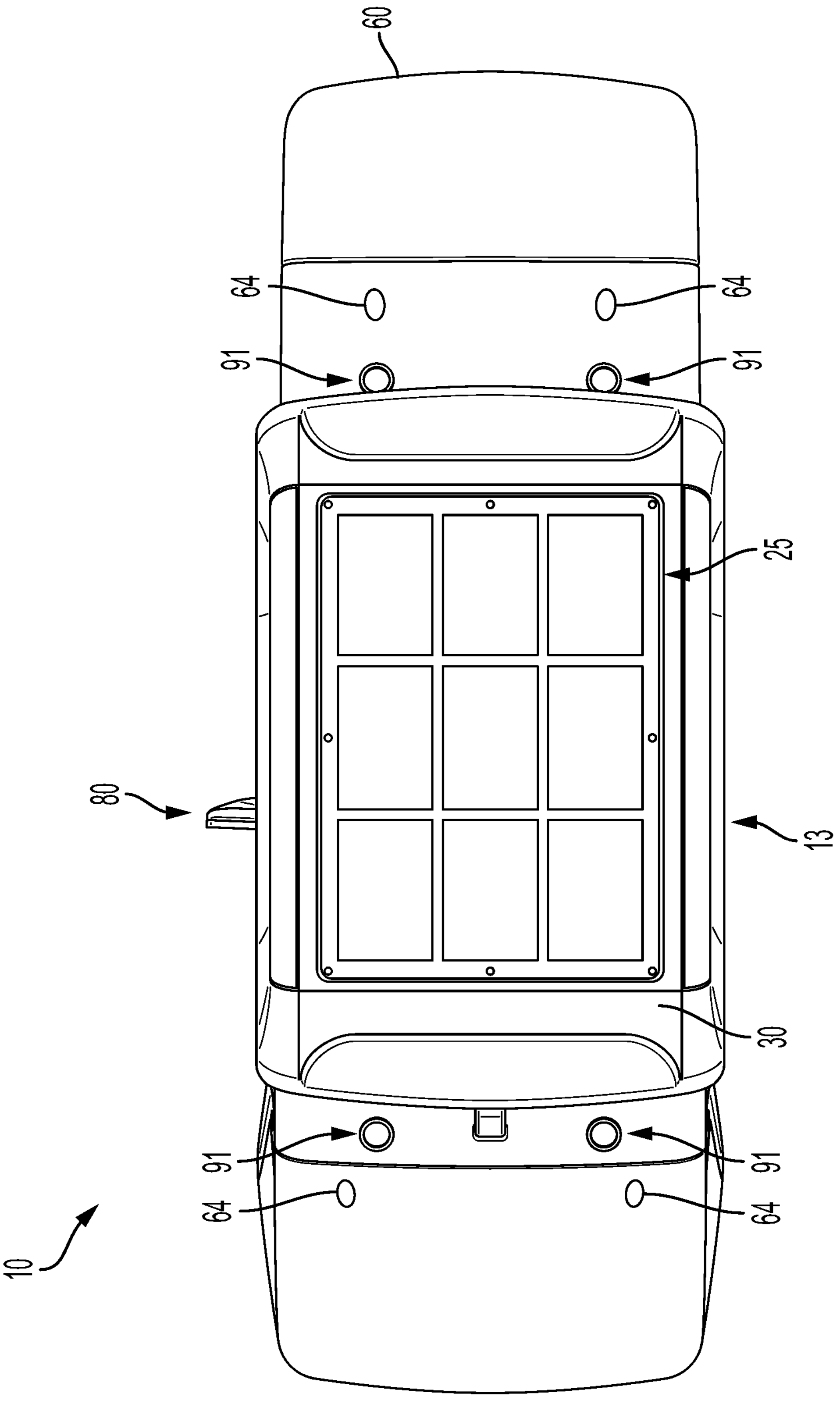

Referring now to FIGS. 1A and 4, the pod apparatus 10 includes a top cover structure 15 that is preferably constructed of a hollow front cover shell 60 and a hollow rear cover shell 70. Similarly to the base housing shell 13, front cover shell 60 and rear cover shell 70 are preferably formed by a rotomolding operation, with the front cover shell 60 including a pair of opposed flanges 62*a*/62*b* and the rear cover shell 70 including a pair of opposed flanges 72*a*/72*b*. As best seen in FIG. 4, a first flange 72*a* of rear cover shell 70 is correspondingly shaped to a first flange 17*a* of the base housing shell 13. Similarly, a first flange 62*a* of the front cover shell 60 is correspondingly shaped to a second flange 17*b* of the base housing shell 13. Once the correspondingly-shaped flanges are matingly positioned adjacent each other, a plurality of fasteners 64 are utilized to secure the front cover shell 60 and the rear cover shell 70 to the base housing shell 13, as best seen in FIG. 3D. Additionally, front cover shell 60 includes a second flange 62*b* that is correspondingly-shaped to the second flange 72*b* of the rear cover shell 70. As shown in FIG. 3C, fasteners 64 are also used to secure the adjacent flanges of the front cover shell 60 and the rear cover shell 70 together. By forming the housing structure 12 of hollow rotomolded portions, assembly of the pod apparatus 10 is simplified as all wiring, liquid piping, electrical components, etc., may be readily routed and disposed within the hollow housing structure 12. Note also, the front cover shell 60 includes a recess 66 for receiving a video display panel 86, whereas the rear cover shell 70 includes a pair of recesses 74 for receiving either fans, or vents, of a climate control system, as discussed in greater detail below. Note, in alternate embodiments, the housing structure 12 may be formed of more than, or less than, three shell portions. Moreover, the housing structure need not be formed by rotomolding in alternate embodiments.

Still referring to FIGS. 1A and 4, the preferred embodiment of the housing structure 12 of the pod assembly 10 also includes a pair of side panels 71 extending forwardly from the rear cover portion 70 in the vicinity of the head of the user 100. The side panels 71, along with the top cover portion 15, offer the user a feeling of privacy not afforded by standard massage beds. However, because the remainder of each side of the pod assembly remains open, a user 100 should be able to get the feeling of privacy while avoiding any feelings of claustrophobia. However, in alternate embodiments, one side of the pod assembly may be fully enclosed while the opposite side remains open. Further, in alternate embodiments, a curtain or shade may be provided on the open side, or sides, for full privacy when desired. Although the embodiment shown is designed to support only one user, alternate embodiments may be wide enough so that multiple users may utilize the pod assembly simultaneously.

Referring again to FIG. 4, an alternate embodiment of a pod apparatus is discussed. Although the housing structure 12 is practically identical to that of the previously discussed embodiment (FIGS. 1A, 1B, and 1C), the present embodiment does not include a fluid spray assembly 16. Rather, the present embodiment includes one or more of heating elements 85, vibratory motors 89, or liquid bags 97 disposed within the user support surface 14. The user support surface 14 is substantially thicker than that of the first embodiment so that the components noted above may be stored therein in close contact to the user. Where liquid bags 97 are present, a fluid supply arrangement 18 is required to circulate liquid of the desired temperature through the liquid bags 97. However, in these embodiments where only heating elements 85 and vibratory motors 89 are utilized, the fluid supply may be omitted, as well as the enclosure 25.

Figure 5:
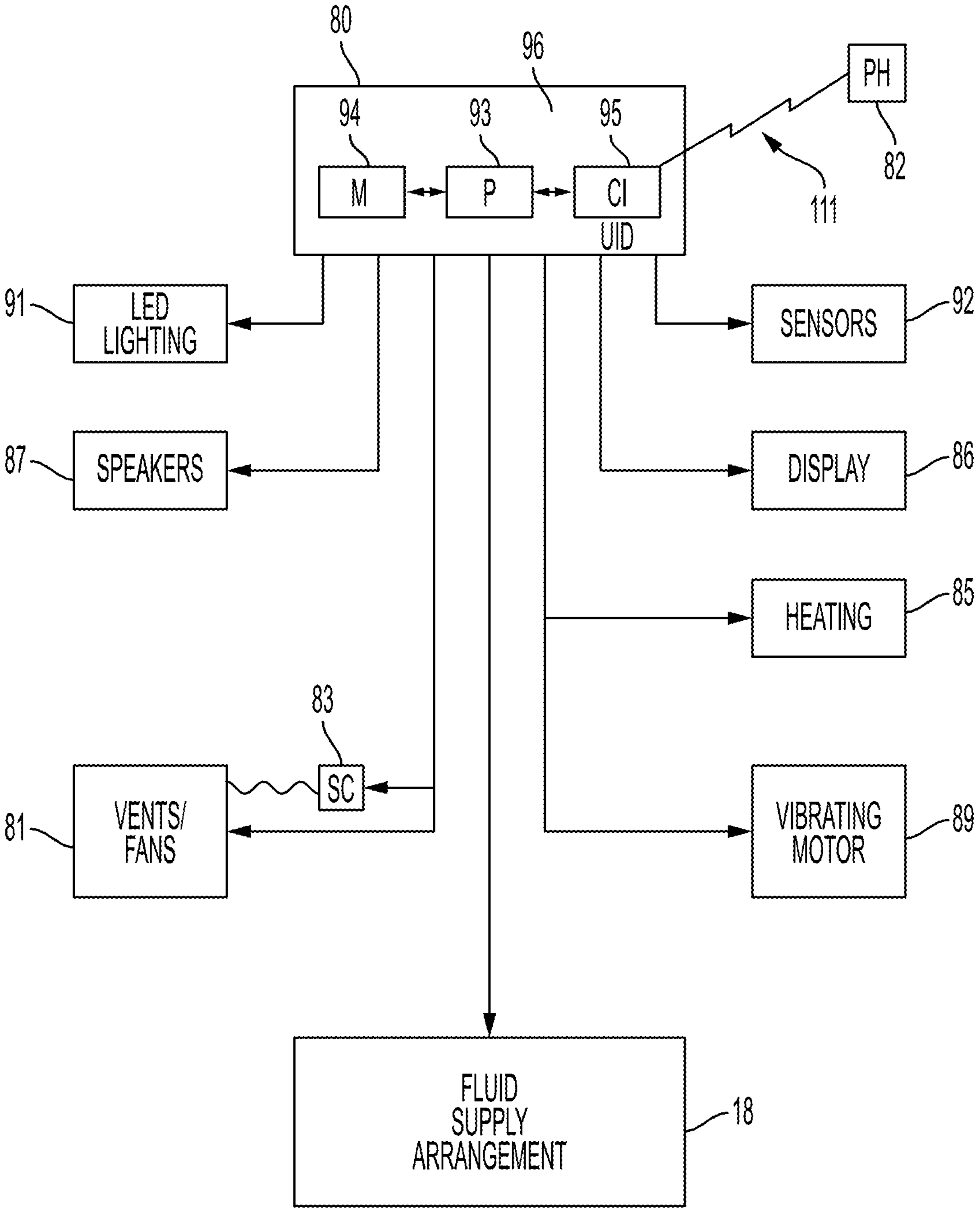
FIG. 5 is a block diagram of an example recovery and wellness pod apparatus architecture in accordance with the sample embodiments.

Referring now to FIG. 5, the recovery and wellness pod apparatus 10 is configured to perform a number of therapeutic operations on a user 100. For example, not only does the pod apparatus 10 include an ergonomic user support surface 14 to properly position the user during operations such as, but not limited to, hydrotherapy, vibratory massage, and heat treatments, as discussed in greater detail below, but the pod apparatus 10 also includes a large video display panel 86 received in recess 66 of the front cover shell 60, audio speakers 87 mounted to the inner wall of the front cover shell 60 (as shown in FIG. 2) adjacent the user's head, fans or vents 81 received in recesses 74 of the rear cover portion 70, a scent chamber ("SC") 83 associated with the fans/vents of the climate control system, heating and/or vibrating motors 85 and 89 (FIG. 4), respectively, disposed within the user support surface 14, and as previously discussed, the fluid supply arrangement 18 for performing water massage treatments. All of these operations may be controlled by a user interface display 80 that is positioned for easy access by a user 100 while disposed on the user support surface 34, as best seen in FIG. 1A. For example, by way of a touchscreen 96 on the user interface display 80, the user 100 may select content for display on the video display panel 86 that may include, but is not limited to, nature relaxation videos, guided meditation videos, travel videos, healthy living videos, reading exercise videos, motivational/inspirational videos, and mindfulness videos. The audio to accompany these videos or wellness content is preferably provided by the speakers 87. Note, however, if the video display panel 86 is not being utilized, the speakers 87 may be utilized to listen to alternate content such as music, podcasts, etc. The speakers 87 are positioned adjacent the user's head so that the user 100 can enjoy full audio, yet not disturb others in the surrounding environment. Note also, the video display panel 86 may be utilized for viewing movies, standard programming, playing video games, etc.

In a preferred embodiment of the pod apparatus 10, the vents 81 of a climate control system are disposed within the pod apparatus 10 so that a user 100 may select to create air flow that is either warmer or cooler than the surrounding environment. Alternately, fans may be used in place of a climate control system so that ambient air is merely recirculated. Working in concert with the climate control system, a scent chamber 83 is provided that when activated by the user 100, releases a desired scent that will pass through the vents 81 (or fans) of the climate control system. For example, a scent option may be selected that accompanies a video experience that a user 100 is viewing on the video display panel, such as a pine scent when viewing a program related to forests. Users may also activate heating elements 85 and/or vibratory motors 89 (FIG. 4) that are disposed within the user support surface 14 to provide a vibration massage and/or heat treatment. Alternately, as discussed in greater detail above with regard to preferred embodiments that include hydrotherapy operations, the user 100 may control the fluid supply arrangement 18 to select the appropriate level of massage and desired temperature of the liquid being utilized.

Additionally, as best seen in FIG. 3D, the user interface display 80 may be used to control LED lighting 91 that is disposed on the underside of the housing structure 12 for the purpose of adding a slight illumination to the room in which the pod apparatus 10 is located. As well, any of a plurality of sensors 92 including, but not limited to, respiratory sensors, pulse oximeters, heart rate monitors, eye motion sensors, etc., may be controlled and monitored through the user interface display 80.

As shown in FIG. 5, the user interface display 80 ("UID") may include a processor 93, a memory 94, and a communications interface ("CI") 95. The processor 93 may be any means configured to execute various programmed operations or instructions stored in a memory device such as a device or circuitry operating in accordance with software or otherwise embodied in hardware or a combination of hardware and software thereby configuring the device or circuitry to perform the corresponding functions of the processor 93 as described herein. In this regard, the processor 93 may be configured to analyze electrical signals communicated thereto in the form of user input commands via the touchscreen. The memory 94 may be configured to store instructions, computer program code, programming, health information, etc., in a non-transitory computer-readable medium for use, such as by the processor 95. The communication interface 95 may be configured to enable connection to external systems. In this manner, the processor 93 may retrieve stored data from external servers via the communication interface 95, in addition to or as an alternative to the memory 94. For example, a user may input commands through a wireless connection 111 with the communications interface 95 with a personal electronic device ("PH") 82 such as, but not limited to, a cell phone, tablet, laptop computer, etc.

It will therefore be readily understood by those persons skilled in the art that the present disclosure is susceptible of a broad utility and application. Many embodiments and adaptations of the present disclosure other than those herein described, as well as many variations, modifications and equivalent arrangements, will be apparent from or reasonably suggested by the present disclosure and the foregoing description thereof, without departing from the substance or scope of the present disclosure. Accordingly, while the present disclosure has been described herein in detail in relation to its preferred embodiment, it is to be understood that this disclosure is only illustrative and exemplary of the present disclosure and is made merely for purposes of providing a full and enabling disclosure of the invention. The foregoing disclosure is not intended or to be construed to limit the present disclosure or otherwise to exclude any such other embodiments, adaptations, variations, modifications and equivalent arrangements, the present disclosure being limited only by the claims appended hereto and the equivalents thereof.

The invention claimed is:

1. An apparatus for relaxation of a user in a reclined position, comprising:

a housing structure having a base portion with a user support surface for supporting the user in the reclined position, the user support surface further includes a substantially planar seat back portion, a substantially planar leg portion, and a seat portion disposed therebetween, wherein the seat back portion and the leg portion form an angle therebetween;

a top cover portion immovably mounted with respect to the base portion, the top cover portion extending from a first end of the base portion to a second end of the base portion, the top cover portion defining a front wall, a rear wall and a sloped top wall, the rear wall being opposite the front wall, the front wall and rear wall each having an exterior convex surface and an interior convex surface;

wherein, when viewed from a lateral side view, the exterior convex surface of the front wall extends from the first end to the sloped top wall to form a single front convex surface and the exterior convex surface of the rear wall extends from the second end to the sloped top wall to form a single rear convex surface, the single front convex surface having a height greater than the single rear convex surface, whereby the user being disposed on the user support surface is disposed between the base portion and the sloped top wall of the top cover portion;

wherein each of the front wall, the rear wall, the sloped top wall, and the base portion are fixedly attached to each other and at least one fixed lateral side opening is defined by the base portion and the top cover portion such that a front portion of the fixed lateral side opening closest to the front wall has a height greater than a rear portion of the fixed lateral side opening closest to the rear wall, the fixed lateral side opening being configured to allow the user's entire body to enter through the fixed lateral side opening to access the user support surface;

a video display disposed on an inner surface of the top cover portion and adapted to be visible to the user when the user is disposed on the user support surface; and a user interface display connected to the housing structure and located separately from the video display, adapted for the user to control functions of the apparatus, wherein the base portion of the housing structure further comprises a substantially hollow shell having a first flange at the first end of the base portion and a second flange at the second end of the base portion, the top cover portion of the housing structure further comprises a substantially hollow shell having a first flange at a first end of the top cover portion and a second flange at a second end of the top cover portion, and the first flange and the second flange of the base portion are affixed to the first flange and the second flange of the top cover portion, respectively.

2. The apparatus of claim 1, further comprising a climate control system having at least one fan disposed on the inner surface of the top cover portion.

3. The apparatus of claim 2, further comprising a scent chamber adjacent the at least one fan, wherein the scent chamber is configured to release a scent into an airstream coming from the at least one fan.

4. The apparatus of claim 1, further comprising a massage assembly disposed in the base portion, the massage assembly further comprising a fluid spray for directing a fluid stream at the user support surface for imparting a massaging effect through the user support surface to an upper body portion and a lower body portion of the user.

5. The apparatus of claim 1, further comprising a massage assembly including a plurality of vibratory motors disposed within the user support surface.

6. The apparatus of claim 1, further comprising at least one heating element disposed within the user support surface.

7. The apparatus of claim 1, wherein the at least one fixed lateral side opening comprises first and second fixed lateral side openings on both first and second lateral sides of the housing structure for the user to access the user support surface.

8. The apparatus of claim 7, further comprising first and second side panels extending between the top cover portion and the base portion in a vicinity of a head of the user when the user is disposed on the user support surface.

9. The apparatus of claim 8, wherein the top cover portion of the housing structure further comprises a substantially hollow front cover portion and a substantially hollow rear cover portion, wherein the first and second side panels are disposed on a corresponding edge of the rear cover portion.

10. The apparatus of claim 1, further comprising a scent chamber and wherein the top cover portion comprises a hollow shell providing a passage for a flow of air carrying scent from the scent chamber.

* * * * *